(12) United States Patent
Alghunaimi et al.

(10) Patent No.: US 12,421,142 B2
(45) Date of Patent: Sep. 23, 2025

(54) METHOD OF SULFATE REMOVAL FROM SEAWATER USING HIGH SALINITY PRODUCED WATER

(71) Applicant: SAUDI ARABIAN OIL COMPANY, Dhahran (SA)

(72) Inventors: Fahd Ibrahim Alghunaimi, Dhahran (SA); Tao Chen, Dhahran (SA); Mohammed Abudullah Bataweel, Dhahran (SA); Hind Saleh Aldossary, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 756 days.

(21) Appl. No.: 17/722,815

(22) Filed: Apr. 18, 2022

(65) Prior Publication Data
US 2023/0331599 A1    Oct. 19, 2023

(51) Int. Cl.
*C02F 1/52* (2023.01)
*C02F 101/10* (2006.01)
(Continued)

(52) U.S. Cl.
CPC .......... *C02F 1/5236* (2013.01); *C02F 1/5209* (2013.01); *C02F 2101/101* (2013.01);
(Continued)

(58) Field of Classification Search
CPC ............................ C02F 1/5236; C02F 1/5209; C02F 2101/101; C02F 2103/08; C02F 2103/10;
(Continued)

(56) References Cited

U.S. PATENT DOCUMENTS 6,164,379 A    12/2000   de Oliveira et al.
8,915,301 B1   12/2014   Bader
(Continued)

FOREIGN PATENT DOCUMENTS

WO    2020080955 A1    4/2020

OTHER PUBLICATIONS

Bedrikovetsky, Pavel G., et al. "Produced water re-injection with seawater treated by sulphate reduction plant: Injectivity decline, analytical model", Journal of Petroleum Science and Engineering. May 18, 2009, pp. 19-28, [10 Pages].
(Continued)

*Primary Examiner* — Pranav N Patel
(74) *Attorney, Agent, or Firm* — Osha Bergman Watanabe & Burton LLP

(57) ABSTRACT

A method of desulfating seawater includes adding a produced water to a sulfated seawater, forming a first precipitate, separating the first precipitate from the sulfated seawater, measuring the sulfate ion concentration of the desulfated seawater, adding a precipitating agent to the sulfated seawater, and separating a second precipitate from the sulfated seawater. Another method of desulfating seawater includes determining concentrations of sulfates in a sulfated seawater and a precipitating agent in a produced water, adding the produced water to the sulfated seawater based on the determined concentrations of sulfates in the sulfated seawater and the precipitating agent in the produced water, forming a first precipitate, separating the first precipitate from the sulfated seawater, measuring the sulfate ion concentration of the desulfated seawater, adding a precipitating agent to a sulfated seawater, and separating a second precipitate from the sulfated seawater.

19 Claims, 3 Drawing Sheets

(51) Int. Cl.
  *C02F 103/08* (2006.01)
  *C02F 103/10* (2006.01)
(52) U.S. Cl.
  CPC ...... *C02F 2103/08* (2013.01); *C02F 2103/10* (2013.01); *C02F 2209/001* (2013.01); *C02F 2209/05* (2013.01); *C02F 2209/19* (2013.01); *C02F 2301/08* (2013.01); *C02F 2303/22* (2013.01); *C02F 2305/00* (2013.01)
(58) Field of Classification Search
  CPC ............ C02F 2209/001; C02F 2209/05; C02F 2209/19; C02F 2301/08; C02F 2303/22; C02F 2305/00; C02F 1/40
  See application file for complete search history.

(56) References Cited

U.S. PATENT DOCUMENTS

| | | |
|---|---|---|
| 10,501,680 B2 | 12/2019 | Li et al. |
| 10,563,119 B2 | 2/2020 | Li et al. |
| 2019/0225867 A1 | 7/2019 | Li et al. |
| 2020/0399145 A1 | 12/2020 | Janson et al. |

OTHER PUBLICATIONS

Ferguson, Robert J., et al. "The chemistry of strontium and barium scales", Association of Water Technologies. Oct. 2010, pp. 1-17, [17 Pages].

Zhang, Zhang. "Solid solution formation kinetics—A preliminary study for CaCO 3/BaCO 3 and BaSO 4/SrSO 4 system", Rice University. Aug. 2013, pp. 1-140, [140 Pages].

Li, Ying-Hsiao, et al. "A novel approach to predict the co-precipitation of BaSO4 and SrSO4", InSPE Production Operations Symposium. Apr. 2, 1995, pp. 447-461, [15 Pages].

Heatherly, M. W., et al. "Sulfate removal technology for seawater waterflood injection", InOffshore Technology Conference. May 2, 1994, pp. 745-762, [18 Pages].

Binghanim, Ahmed, et al. "Scale mitigation strategy for fracturing using seawater-based fluid", InSPE Kingdom of Saudi Arabia Annual Technical Symposium and Exhibition. Apr. 24, 2017, pp. 1-13, [13 Pages].

Runtti, Hanna, et al. "How to tackle the stringent sulfate removal requirements in mine water treatmen—A review of potential methods", Environmental research. Jul. 9, 2018, pp. 207-222, [16 Pages].

Silva, Adarlene M., et al. "Mine water treatment with limestone for sulfate removal", Journal of Hazardous Materials. Jun. 30, 2012, pp. 45-55, [11 Pages].

Korngold, Emanuel. "Sulfate removal from the sea by anion exchange process combined with k2 so4 precipitation", Desalination and Water Treatment. Oct. 2020, pp. 150-154, [5 Pages].

"Sulfate Removal System Effectively and efficiently remove divalent sulfate ions from seawater down to the required level for injection", Schlumberger. 2019, pp. 1-4, [4 Pages].

International Search Report and Written Opinion Issued in Corresponding Application No. PCT/US2023/065888, mailed Jun. 22, 2023, 11 pages.

METHOD OF SULFATE REMOVAL FROM SEAWATER USING HIGH SALINITY PRODUCED WATER

BACKGROUND

Oil and gas reservoir applications have recently shifted to using available seawater for various applications over growing concerns of lack of freshwater sources. Hydraulic fracturing, for example, can require millions of gallons of water per treatment. Seawater has a high salinity content, and often, seawater has a high concentration of sulfate ions.

When an untreated seawater is injected downhole, the dissolved sulfate ions in seawater may react with compounds present in rock, formation brine, injection fluids, and produced fluids that produce a sulfate scale. In such instances, is the formation of sulfate scale and sulfate scale deposition indicates the incompatibility of the seawater for drilling operations. This sulfate scale (or "sulfate precipitate") formation and deposition may occur in the wellbore or near the wellbore area, and it often causes formation damage that may offset the performance of drilling and recovery applications. In addition, sulfate ions introduced to the well can lead to toxic hydrogen sulfide ($H_2S$) production. Thus, costly treatment methods, such as nanofiltration have been aimed at reducing sulfate levels to prevent these effects.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of desulfating seawater. The method may include adding an amount of a produced water to an amount of a sulfated seawater to form a first precipitating solution, agitating the first precipitating solution thereby forming a first precipitate, separating the first precipitate from the sulfated seawater to produce a desulfated seawater having a first concentration of sulfate ions, measuring the sulfate ion concentration of the desulfated seawater, adding a precipitating agent to an amount of a sulfated seawater to form a second precipitating solution including a second precipitate, and separating the second precipitate from the sulfated seawater to produce a desulfated seawater having a second concentration of sulfate ions.

In another aspect, embodiments disclosed herein relate to a method of desulfating seawater. The method includes determining a concentration of sulfates in a sulfated seawater, determining a concentration of a precipitating agent in a produced water, adding an amount of the produced water to an amount of the sulfated seawater to form a first precipitating solution based on the determined concentration of sulfates in the sulfated seawater and the concentration of the precipitating agent in the produced water, agitating the first precipitating solution thereby forming a first precipitate, separating the first precipitate from the sulfated seawater to produce a desulfated seawater having a first concentration of sulfate ions, measuring the sulfate ion concentration of the desulfated seawater, adding a precipitating agent to an amount of a sulfated seawater to form a second precipitating solution including a second precipitate, and separating the second precipitate from the sulfated seawater to produce a desulfated seawater having a second concentration of sulfate ions. The precipitating agent may be an alkaline earth metal halide selected from the group consisting of barium halide, calcium halide, strontium halide, and combinations thereof.

Other aspects and advantages of the claimed subject matter will be apparent from the following description and the appended claims.

DETAILED DESCRIPTION

Figure 1:
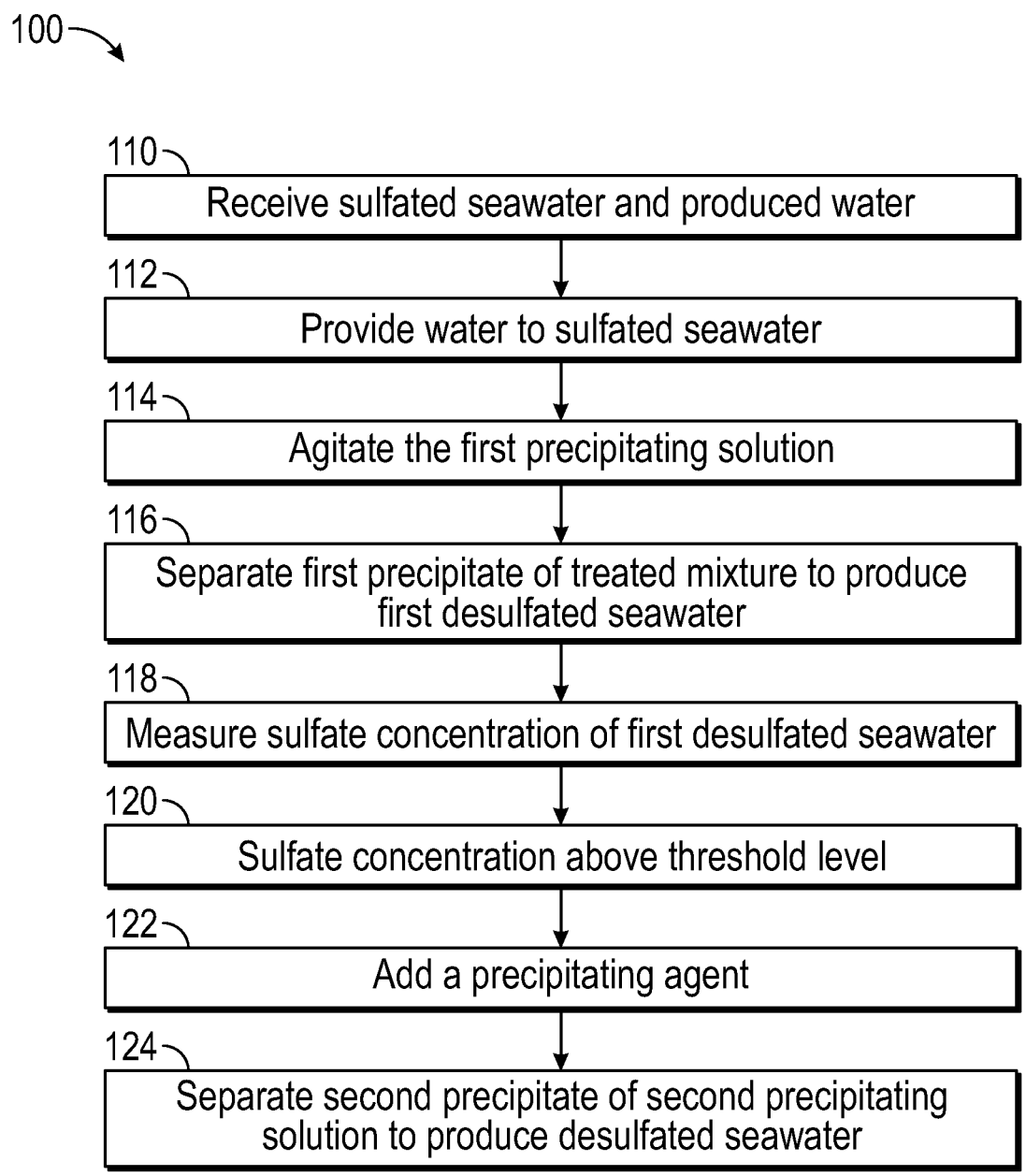
FIG. 1 is a flowchart of a method of desulfating a seawater in accordance with one or more embodiments of the present disclosure.

In one aspect, embodiments disclosed herein relate to a sulfate remediation method from seawater. Sulfates in a concentration of above a threshold level, such as 500 parts per million (ppm), may cause sulfate scale deposits (or sulfate precipitates) to form in or around oil and gas reservoirs upon contact with a precipitating agent. For example, an untreated seawater, such as an Arabian Gulf seawater as described in Table 1, may cause sulfate scale more readily than a treated seawater, such as a nano-filtered seawater (Table 1).

TABLE 1

| Water chemistry of the seawater and nano-filtered seawater | | |
|---|---|---|
| Ion | Arabian Gulf Seawater (ppm) | Nano-filtered Seawater (ppm) |
| $Na^+$ | 16,180 | 16,280 |
| $Ca^{2+}$ | 650 | 213 |
| $Mg^{2+}$ | 1,730 | 256 |
| $K^+$ | 700 | 519 |
| $Sr^{2+}$ | 1 | <1 |
| $Ba^{2+}$ | <1 | 0 |
| $Cl^-$ | 31,000 | 26,401 |
| $SO_4^{2-}$ | 4,020 | 297 |
| $HCO_3^-$ | 126 | 103 |

In such embodiments, scale formation may occur at any point during oil and gas drilling operations. Thus, one or more embodiments of the present disclosure relate to a simple and efficient method of sulfate removal from seawater.

One or more embodiments of the present disclosure includes a sulfate remediation method of mixing an amount of an amount of a produced water to a sulfated seawater to form a first precipitating solution, agitating the precipitating solution thereby forming a first precipitate, separating the first precipitate from the sulfated seawater to produce a first desulfated seawater having a first concentration of sulfate ions, measuring the sulfate ion concentration of the first desulfated seawater, adding a precipitating agent to an amount of the first desulfated seawater to form a second precipitating solution comprising a second precipitate and a second desulfated seawater, separating the second precipitate from the first desulfated seawater to produce a desulfated seawater having a second concentration of sulfate ions.

In one or more embodiments, the method may further include mixing a flocculating agent to form an agglomeration of the sulfate precipitates. In such embodiments, the flocculating agent may promote more efficient sulfate precipitate agglomeration and higher removal efficiency. In particular embodiments, the first desulfated seawater, the second desulfated seawater, and combinations thereof may be used as an injection fluid in oil and gas operations.

Aqueous Fluid

As noted above, methods in accordance with one or more embodiments of the present disclosure relate to sulfate remediation using produced water and sulfated seawater. In one or more embodiments, the sulfated seawater used in the treatment process is an untreated seawater. The untreated seawater is seawater that has not been substantially processed or treated to change the chemical properties of or to remove contaminants from the seawater between the moment the seawater is obtained and the moment the seawater is used.

The term "seawater" is defined as any aqueous fluid that is obtained from a natural water bearing source that is not a freshwater source. The salinity, dissolved solids, and pH can vary from one seawater source to another seawater source. Further, the seawater may include a range of sulfate concentrations from about 100 mg/L of sulfates to at least 4000 milligram per liter (mg/L) of sulfate, or at least 5000 mg/L of sulfate. The seawater of one or more embodiments may be tested to determine the sulfate concentration prior to treatment. Other salts that are found in seawater may include sodium, calcium, aluminum, magnesium, potassium, strontium, and lithium salts of halides, carbonates, chlorates, bromates, nitrates, oxides, phosphates, among others. Table 2 displays exemplary ionic contents of a freshwater, a seawater, and a produced water.

TABLE 2

Examples of ionic content of freshwater, Arabian Gulf Seawater and a high salinity produced water.

| Ion | Freshwater (mg/l) | Arabian Gulf Seawater (mg/l) | High Salinity Produced Water (ppm) |
|---|---|---|---|
| $Na^+$ | 27 | 16,180 | 7,000 |
| $Ca^{2+}$ | 144 | 650 | 25,000 |
| $Mg^{2+}$ | 55 | 1730 | 2,000 |
| $K^+$ | 2 | 700 | 4,000 |
| $Sr^{2+}$ | 0 | <1 | 2,000 |
| $Ba^{2+}$ | 0 | 0 | 4,000 |
| $Cl^-$ | 53 | 29,000 | 160,000 |
| $SO_4^{2-}$ | 60 | 4,020 | 0 |

In one or more embodiments, the sulfated seawater may be a treated seawater. Such treatments include a processing to remove contaminants, such as nano-filtration to reduce sulfate concentrations.

In one or more embodiments, the seawater does not include a scale inhibitor. A scale inhibitor is any component that may be added to a fluid to delay, reduce, or prevent scale deposition on equipment or piping. Some non-limiting examples of scale inhibitors include acrylic acid polymers, maleic acid polymers, and phosphates. In some implementations, a salt is dissolved in the first precipitating solution to increase a potential of hydrogen (pH) of the first precipitating solution. The pH of the first precipitating solution can be between 7 and 9. For example, sodium bicarbonate ($NaHCO_3$) can be dissolved in the first precipitating solution to increase the pH of the first precipitating solution to approximately 7.

The term "produced water" is defined as any aqueous fluid that is produced from a well in oil and gas operations, such as water that occurs naturally within a rock (such as formation water) or water trapped in a rock during its formation (such as connate water), which may be produced from a well. The produced water may also include any brine, brackish water, and combinations thereof.

In particular embodiments, the produced water may include an additive. The additive may be a precipitating agent. In such embodiments, the precipitating agent may be dissolved in the produced water. A source of the precipitating agent dissolved in the produced water may be a formation of a reservoir, such that the produced water carries or dissolves the precipitating agent from the formation to a surface of the reservoir.

The precipitating agent of the produced water is may include an amount (or "a concentration") of ions of the produced water. The concentration of ions of the produced water may include at least one cation. The cation may be an alkaline earth metal divalent cation. The produced water may include an alkaline earth metal cation precipitating agent from the formation of the reservoir. The alkaline earth metal cations may be selected from the group consisting of calcium cations, barium cations, strontium cations, and combinations thereof. In such embodiments, calcium cation precipitating agents may be in concentration range with a lower limit lower limit from about 2,000, 3,000, 4,500, 5,000, 7,500, 10,000, 12,500, or 15,000 ppm to an upper limit of about 10,000, 15,000, 17,500, 20,000, 22,500, or 25,000 ppm. Barium cation precipitating agents may be in a concentration range with a lower limit from about 1,000, 1,250, 1,500, 1,750, 2,000, or 2,500 ppm to an upper limit of about 2,000, 2,250, 2,500, 2,750, 3,000, 3,500, or 4,000 ppm.

In one or more embodiments, the precipitating agents may be added to the produced water after collection from a reservoir. In such embodiments, non-limiting examples of the precipitating agent additives are barium chloride ($BaCl_2$), calcium chloride ($CaCl_2$)), their respective hydrates ($BaCl_2 \cdot H_2O$ and $CaCl_2 \cdot H_2O$), and combinations thereof.

Calcium chloride precipitating agents of one or more embodiments may be added in an amount such that calcium ions are in a range with a lower limit from about 2,000, 3,000, 4,500, 5,000, 7,500, 10,000, 12,500, 15,000 ppm to an upper limit of about 10,000, 15,000, 17,500, 20,000, 22,500, 25,000 ppm. Barium chloride precipitating agents of one or more embodiments may be added in an amount such that calcium ions are in a range with a lower limit from about 1,000, 1,250, 1,500, 1,750, 2,000, 2,500 ppm to an upper limit of about 2,000, 2250, 2500, 2750, 3000, 3500, and 4000 ppm.

The salinity, oil content, total dissolved solids, and pH of the produced water can vary from one reservoir to another. The term "total dissolved solids" or "TDS" means a measure of the dissolved combined content of all inorganic and organic substances present in a liquid in molecular, ionized, or micro-granular (colloidal sol) suspended form. Unless indicated otherwise, TDS concentrations are reported in parts per million (ppm). In one or more embodiments, the produced water may have a total dissolved solids content in an amount of at least 55,000 ppm, or at least 60,000 ppm, or at least 70,000 ppm, or at least 80,000 ppm, or at least 100,000 ppm, or at least 200,000 ppm.

The term "hardness" means a measure of the dissolved calcium carbonate equivalent per unit volume of liquid, more generally, water hardness is a measure of the amount of calcium and magnesium salts in water. Hardness concentrations may be reported in milligrams of calcium carbonate equivalent per liter of liquid (mg/L) or parts per million (ppm). In one or more embodiments, the produced water may have a hardness content in an amount of at least 2,500 ppm, or at least 5,000 ppm, or at least 7,000 ppm, or at least 8,000 ppm, or at least 9,000 ppm, or at least 10,000 ppm.

The term "total salt content" means a measure of the water-soluble chemical compound consisting of an ionic assembly of a positively charged metal cation and a negatively charged anion, which results in a compound with no net electric charge. Total salt content is often reported in parts per million (ppm). In one or more embodiments, the produced water may have total salt content in an amount of at least 10,000 ppm, or at least 25,000 ppm. or at least 50,000 ppm, or at least 75,000 ppm. In such embodiments, the produced water may be defined as "a high salinity produced water", where the high salinity produced water has a salt content of at least 100,000 ppm.

The produced water may include at least one of freshwater, seawater brine, water-soluble organic compounds, water-insoluble materials, and mixtures thereof produced from a reservoir. The produced water may contain wastewater containing various salts. The salts dissolved in the produced water may also cause sulfate scale formation such that the salts of the produced water may be at least one precipitating agents. As described above, the salts may include but are not limited to, alkaline earth metal cations, such as barium ($Ba^{2+}$) and calcium ($Ca^{2+}$).

Treating Seawater

FIG. 1 is a block flow diagram of a method 100 of desulfating a seawater in accordance with one or more embodiments of the present disclosure. Step 110 includes providing a sulfated seawater. The sulfated seawater may have a sulfate concentration in a range of 100 ppm to at least 4000 ppm as described above. The sulfated seawater may be an untreated sulfated seawater. In particular embodiments, the sulfated seawater may be received at a well site in which the fluid injection and geologic formation treatment may be performed.

In step 112, an amount of a produced water is added to the sulfated seawater to form a first precipitate. In one or more embodiments, the seawater may be tested prior to use to determine the sulfate concentration. The produced water may include a precipitating agent. In one or more embodiments, the produced water may be tested to determine the precipitating agent concentration prior to treating a seawater. The precipitating agent may be an amount of solubilized ions, such as divalent cations. Divalent cations may include an alkaline earth metal cation as described above. Non-limiting examples of the alkaline earth metal cations include barium cations, calcium cations, and combinations thereof. An amount of the alkaline earth metal cations of the produced water may be in a concentration ranges as described above.

In one or more particular embodiments, the produced water may be processed prior to treating seawater. In such embodiments, the produced water may be separated from any produced hydrocarbons contaminants (or "de-oiled"). The de-oiled produced water may then be tested prior to use to determine the precipitating agent concentration. Based on the concentration of the precipitating agent determined in the produced water, in one or more embodiments, an amount of produced water may be determined to be sufficient to treat an amount of seawater.

The addition of the produced water to the sulfated seawater of step 112 yields a first precipitating solution. In step 114, the first precipitating solution is agitated. Agitating the first precipitating solution of step 114 may facilitate precipitation of sulfate anions from the seawater with salts of the produced water such that a first precipitate is formed. In one or more embodiments, the first precipitate may include calcium sulfate ($CaSO_4$), barium sulfate ($BaSO_4$), and combinations thereof.

In one or more embodiments, the agitation may be a simple stirring mechanism, pumping a produced water into a seawater (or vice versa), or a greater agitation as known to one of ordinary skill. In such embodiments, a maximum precipitation time such that a substantial amount of precipitate forms is at most about 6 hours. In embodiments in which no agitation is performed, a precipitate formation may be extended to between about 1 to 3 days.

In one or more embodiments, at least one solubilized alkaline earth metal cation (e.g., $Ca^{+2}$ or $Ba^{+2}$) in the produced water serve as a precipitating agent. In such embodiments, at least one precipitate is formed upon complexation with sulfate ions. Such a process may occur according to Equations 1 and 2, below.

$$Ca_{(aq)}^{2+} + SO_{4(aq)}^{2-} \rightarrow CaSO_{4(s)} \qquad \text{Eqn. 1}$$

$$Ba_{(aq)}^{2+} + SO_{4(aq)}^{2-} \rightarrow BaSO_{4(s)} \qquad \text{Eqn. 2}$$

Molecular interactions between the precipitating agent and sulfate ions of the sulfated seawater may be promoted through agitating the mixture. As one of ordinary skill can appreciate, agitation, such as mechanical mixing, promotes molecular interactions, such as ion association of the precipitating agent with sulfates of the seawater. Ion association and complexation between sulfates and alkaline earth metals, such as barium and calcium cations, occurs such that the ionic association decreases the solubility of the resultant sulfate complex ($CaSO_4$ or $BaSO_4$) from aqueous solutions such that a solid is formed in the treated mixture.

In one or more embodiments, the composition of produced water may determine the type of precipitate formed upon treatment of a seawater. As a non-limiting example, if a produced water contains a relatively high concentration of $Ba^{2+}$ ions, $BaSO_4$ deposits and forms a precipitate. Another non-limiting example includes if a produced water contains a relatively high concentration of $Ca^{2+}$ ions, $CaSO_4$ may deposit and form a precipitate.

Optionally, a flocculating agent may be added to the first precipitating solution. In such embodiments, a flocculating agent may be added to accelerate the process of precipitation, which shortens the precipitation time. In such methods, the flocculating agent may cause the first precipitate to agglomerate. The agglomeration of sulfate precipitate particles may accelerate the settling of the precipitate and further facilitate separating the precipitate from the treated fluid (FIG. 1, step 116). Non-limiting examples of flocculating agents include a viscosifier, a friction reducer, and combinations thereof. The flocculating agent may include a polymer, a copolymer, a hydrate such as aluminum sulfate hydrate ($Al_2(SO_4)_3 \cdot H_2O$), or combinations thereof. Examples of suitable flocculating agents include cationic, anionic, and non-ionic polyacrylamides and acrylamide copolymers. In one or more embodiments, coagulants may be used in conjunction with the flocculating agents, for example, a coagulant that includes aluminum or iron compounds may also be added with the flocculating agent.

The first precipitate may be separated from the first precipitating solution in step 116 of FIG. 1. As one of ordinary skill in the art may appreciate, non-limiting examples of separation of the sulfate precipitates may include decanting, filtration, and combinations thereof. In particular embodiments, the first precipitate agglomerated via the addition of a flocculating agent as described above may settle to a bottom portion of a vessel for removal.

In one or more embodiments, a separator, such as a centrifugal separator, a weir separator, or a gravity-based precipitation vessel, is employed to remove the agglomerated sulfate precipitate from the seawater to yield a treated fluid. In such embodiments, a desulfated seawater is produced. The desulfated seawater may have a first sulfate concentration.

In order to avoid detrimental scale formation as described above, the sulfate concentration in the treated seawater should be below a threshold concentration prior to use in oil and gas operations. In one or more embodiments, the threshold level of sulfates may be 500 ppm of sulfate ions. In such embodiments, desulfated seawater having sulfates below the threshold level may be used as in oil and gas operations, such as an injection fluid, a fracturing fluid, and a fluid for treating an oil and gas reservoir, such as a base fluid of an injection fluid.

In order to determine whether the desulfated seawater from the first precipitating solution may be used in oil and gas operations, after the precipitated sulfate has been separated from the first precipitating solution, a sulfate ion concentration of the desulfated seawater may be measured in step 118 (FIG. 1). The resultant concentration may be referred to as the first concentration of sulfates. As one of ordinary skill in the art may appreciate, a method of measuring the sulfate ion concentration may include geochemical analyses, such as ion chromatography.

In one or more embodiments, the first concentration of sulfates of the desulfated seawater may be above a threshold concentration and lower than a solubility limit of sulfate ions. The threshold concentration may be 500 ppm of sulfate ions. The desulfated seawater of one or more embodiments may have a sulfate content above the threshold concentration, such that further treatment is required. In such embodiments, the sulfate concentration may be at least 500 ppm of sulfate ions. As described above, sulfate scale may form in downhole equipment when injection fluids that include an amount of 500 ppm sulfates or more encounter downhole chemicals and conditions.

In one or more embodiments, a measured sulfate ion concentration that is above the threshold concentration (step 120, FIG. 1) may indicate that the treated fluid requires a second treatment to further reduce sulfate levels. As described above, the second treatment may include adding a precipitating agent to an amount of a sulfated seawater to form a second precipitating solution including a second precipitate (FIG. 1, step 122).

In one or more embodiments, the precipitating agent may be at least one metal halide, such as an alkaline earth metal halide. The alkaline earth metal halide may be barium chloride ($BaCl_2$), calcium chloride ($CaCl_2$), strontium chloride ($SrCl_2$), or hydrates thereof ($BaCl_2 \cdot H_2O$, $CaCl_2 \cdot H_2O$, $SrCl_2 \cdot H_2O$). The precipitating agent may include a combination of alkaline earth metal halides, hydrates thereof, and combinations thereof. In such embodiments, the precipitating agent promotes formation of a second precipitate. The second precipitate includes sulfate ions that may be ionically associated with solvated alkaline earth metal cations as described in the mechanism above.

In such embodiments, the precipitating agent may be included in the second precipitating solution in a range of about 0.01 to 15.0 wt. % (weight percent) of the total volume of solution. For example, the precipitating agent may be added to the second precipitating solution in an amount ranging from a lower limit of any of 0.01, 0.05, 0.1, 0.5, 1.0, 2.5, 5.0, 1.5, 10.0, and 12.5 wt. % to an upper limit of any of 0.1, 0.5, 1.0, 2.5, 5.0, 7.5, 10.0, 12.5, and 15.0 wt. %, where any lower limit can be used in combination with any mathematically-compatible upper limit.

In one or more embodiments, the type of the precipitating agent added may be determined based on the concentration of sulfates in the sulfated seawater. For example, barium ions may be particularly useful when the sulfate concentration is higher. In particular, when a higher concentration of sulfate is present in the sulfated seawater (e.g., around 4000 ppm), $BaCl_2$, $BaCl_2 \cdot H_2O$, or combinations thereof may be added.

Once a precipitate has formed due to the addition of the precipitating agent, the second precipitate of the second precipitating solution may be separated 124 from the solution to produce a desulfated seawater having a second concentration of sulfate ions. The separating the second precipitate of the second precipitating solution may include processes as described above. In such embodiments, the second concentration of sulfate ions of the desulfated seawater may be below the threshold level of sulfate ions as described above. The desulfated seawater having the second concentration of sulfate ions below the threshold level of sulfate ions may be used in oil and gas applications, such as reservoir drilling operations.

The desulfated seawater of embodiments of the present disclosure may be delivered (e.g., through an oil and gas reservoir, such as a wellbore) to a subterranean zone in a geological formation for hydraulic fracturing of the subterranean zone. For example, the treated fluid may be pumped downhole into the subterranean zone. The treated fluid of one or more embodiments may include one or more additives. The additives may be any conventionally known and one of ordinary skill in the art may appreciate that the selection of said additives will be dependent upon the intended application of the treated fluid. For instance, if the treated fluid is to be used as a fracturing fluid, it may comprise a proppant such as sand. In some embodiments, the additives may be one or more selected from clay stabilizers, corrosion inhibitors, biocides, friction reducers, thickeners, and the like.

As one of ordinary skill of the art may appreciate, embodiments described herein may be used for any number of oil and gas operations. Such operations may include enhanced oil recovery, matrix stimulation, fracturing and drilling, among others. A particular embodiment is described in FIG. 2, in which seawater treatment in combination with a fracturing operation.

Figure 2:
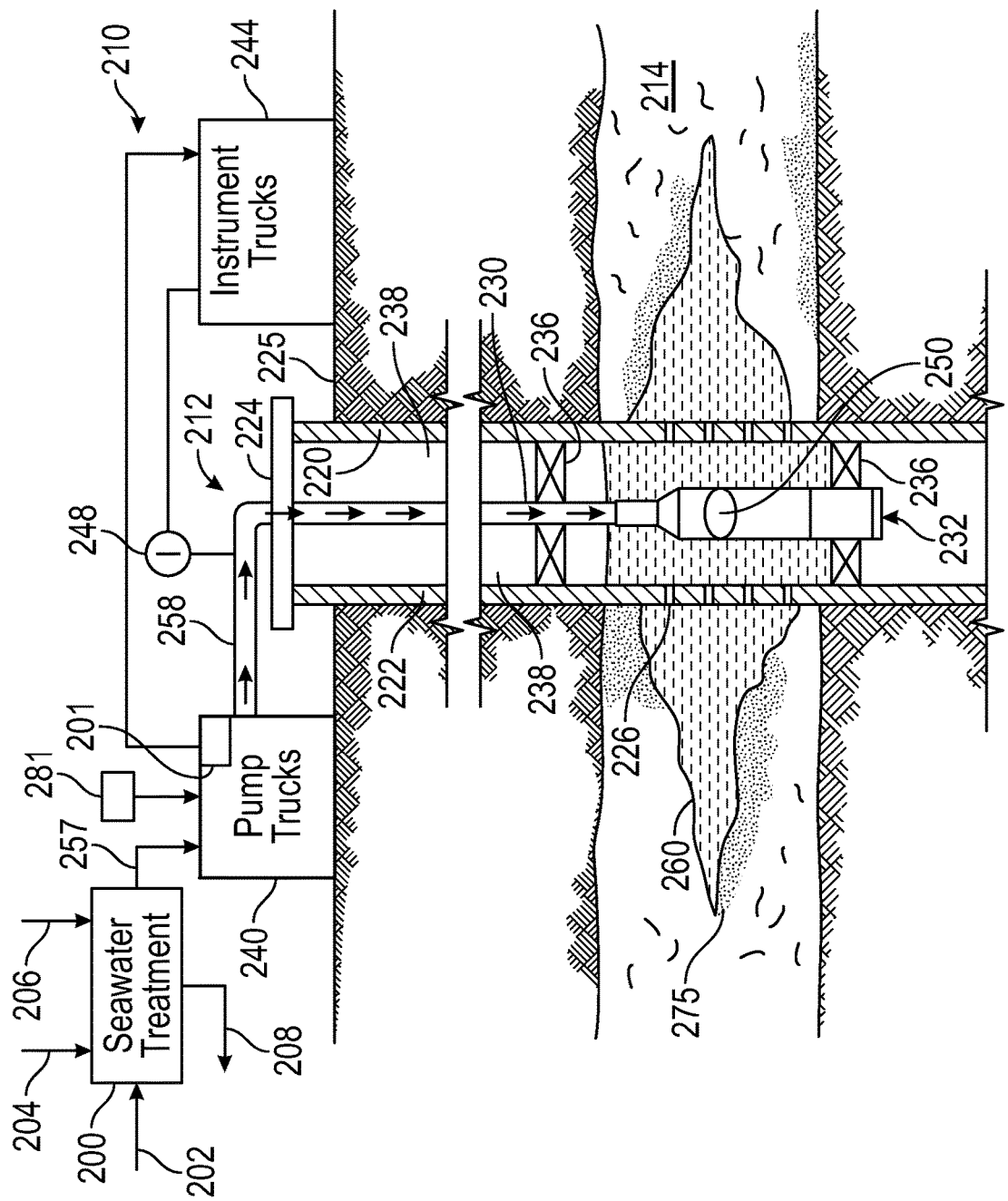
FIG. 2 is a schematic of an example of a reservoir treatment for a well in accordance with one or more embodiments.

FIG. 2 illustrates an example of a reservoir treatment 210 for a well 212. The well 212 may be in a wellbore 220 formed in a subterranean zone 214 of a geological formation in the Earth's crust. The subterranean zone 214 may include, for example, a formation, a portion of a formation, or multiple formations in a hydrocarbon-bearing reservoir from which recovery operations can be practiced to recover trapped hydrocarbons. In some implementations, the subterranean zone 214 includes an underground formation of naturally fractured rock containing hydrocarbons (for example, oil, gas, or both). In some embodiments, the well 212 may intersect other suitable types of formations, including reservoirs that are not naturally fractured in any significant amount.

The well 212 can include one or more instrument trucks 244, one or more surface sensors 248, one or more downhole sensors 250, a casing 222 and well head 224. The wellbore 220 may be a vertical, horizontal, deviated, or multilateral bore. Perforations 226 may be present in the casing 222 to allow for flow of oil, gas, byproduct, or combinations thereof into the well. The casing 222 may be cemented or otherwise suitably secured in the wellbore 220. For a treatment 210, a work string 230 can be disposed in the well bore 220. The work string 230 may be coiled tubing, sectioned pipe, or other suitable tubing. A drilling tool 232 may be coupled to an end of the work string 230. Packers 236 may seal an annulus 238 of the wellbore 220 uphole of and downhole of the subterranean zone 214.

One or more pump trucks 240 with one or more pump controls 201 may be coupled to the work string 230 at the surface 225. The pump trucks 240 pump fracture fluid 258 down the work string 230 to perform the fracture treatment 210 and generate the fracture 260. The fracture 260 is generated in the rock 275 of the subterranean zone 214. The fracture fluid 258 may include a fluid pad, proppants, flush fluid, or a combination of these components. The fracture fluid 258 may include desulfated seawater 257, as discussed above. The pump trucks 240 may include mobile vehicles, equipment such as skids, or other suitable structures.

In one or more embodiments, the reservoir treatment 210 includes a seawater treatment system 200 that receives and treats seawater 202 to give the desulfated seawater 257 as a base fluid in the treatment fluid 258. The seawater treatment system 200 includes equipment to precipitate sulfates and remove the precipitated sulfate from the seawater 202 according to methods of the present disclosure. Indeed, in operation, the seawater treatment system 200 removes sulfate from the seawater 202.

In operation, the seawater treatment system mixes a produced water 204 with the seawater 202 to precipitate sulfates from the seawater 202 to give sulfate precipitates in the seawater 202. In implementations, the produced water may be produced water from the well 212 or from a nearby well. The produced water stream may include produced water, brine, brackish water, or combinations of these.

The desulfated seawater 257 may have a concentration of sulfate that is lower than a solubility level of sulfate in the desulfated seawater 257. In certain implementations, the desulfated seawater 257 has less than 500 mg/L sulfate, less than 400 mg/L sulfate, less than 300 mg/L sulfate, less than 200 mg/L, less than 100 mg/L sulfate, or less than 90 mg/L sulfate.

The seawater treatment system 200 may include mixers, vessels, settling tanks, clarifiers, separators, pumps, piping, controls, and the like, to precipitate sulfate and remove the sulfate precipitate from the seawater 202. For example, the system 200 may include piping to receive produced water and to incorporate the additive into the produced water 204 and provide the produced water with the additive to, for example, a mixer. In one or more embodiments, a precipitating agent may be added via receiving line 206. Indeed, a mixer may combine the additive with the seawater 202 and combine an optional flocculant with the seawater 202. In one implementation, the mixer is a vessel with an agitator. Furthermore, in certain embodiments, a settling vessel for the desulfated seawater 202 provides for the sulfate precipitate to migrate to the bottom of the settling vessel to be removed via an outlet on a bottom portion of the settling vessel. A separator may be employed. In some implementations, the settling vessel is the vessel with the agitator (turned off) or is another vessel. The system 200 may include a pump as a motive device for flow of the desulfated seawater 257 to the pump trucks 240, and so on.

In particular embodiments, a seawater treatment system includes a mixer to combine a produced water with seawater to precipitate sulfate in the seawater and to combine a flocculating agent with the seawater to agglomerate sulfate precipitate. In implementations, the system processes seawater having a sulfate concentration of at least 3500 milligrams per liter (mg/L). In certain examples, the seawater received is untreated seawater or does not have a scale inhibitor. Further, the system may be configured to receive produced water or brine to incorporate an alkaline earth metal with the seawater. The seawater treatment system separates sulfate precipitate from the seawater via output line 208 to give a sulfated seawater (e.g., sulfate concentration more than 500 mg/L). The system may be configured to further treat a seawater having a first concentration of sulfate ions above a threshold level. In such embodiments, the threshold level of the first concentration of sulfate ions is 500 ppm of sulfate ions.

The seawater treatment system may be configured to perform addition of a precipitating agent to the sulfated seawater to form a second precipitating solution with a second precipitate. The precipitating agent 281 may be mixed with sulfated seawater.

The seawater treatment system separates the second precipitate from the second precipitating solution to give a desulfated seawater having a second sulfate concentration less than 500 ppm. The desulfated seawater having a second sulfate concentration less than 500 ppm may include desulfated seawater 257, such as a mixture of seawater 202 having been treated with a produced water 204 to remove sulfate ions below the threshold level. The desulfated seawater 257 can have less than 500 ppm of sulfate ions, less than 250 ppm of sulfate ions, less than 100 ppm of sulfate ions, or a lower concentration of sulfate ions. In one or more embodiments, the seawater may have been treated with produced water, additives, and combinations thereof that causes sulfate ions to precipitate from the seawater.

In one or more embodiments, a calculation for formation of a sulfate scale may be performed. This calculation may be used as a predictive tool to guide the type and quantity of precipitating agent to be used. In one or more embodiments, results of the calculation may be determined (or "calculated") prior to performing a seawater treatment method. In such embodiments, the results may be calculated may be on-site at a seawater treatment location or off-site. The calculation for formation of the sulfate scale indicates the scaling tendency and may provide a prediction for the formation of the sulfate scale mass deposit, or sulfate precipitate. In one or more particular embodiments, the predictive calculation may be important to perform when using different sources of seawater and different sources of produced water before the waters are used in the treatment method as described above. In one or more embodiments, results of the predictive calculation may be utilized at a location of seawater treatment.

The calculation for formation of the sulfate scale is shown in Equation 3, below.

$$S_\alpha = (a_1 \times a_2)/K_{(PT)} \quad \text{Eqn. 3}$$

where $S_\alpha$ is the supersaturation ratio, and $a_1$ and $a_2$ are the activity of a precipitating cation and a precipitating anion in the solution, respectively. The term "supersaturation ratio" may be defined as a parameter indicating the thermodynamic driving force for the formation of a type of sulfate precipitate. The solubility product, represented by $K_{(PT)}$, depends upon environmental pressure (P) and environmental temperature (T). The respective activity of the precipitating cation ($a_1$) and the precipitating anion ($a_2$) may be determined using Equation 4 below.

$$a_x = \gamma_x/C_x \quad \text{Eqn. 4}$$

where $a_x$ is the activity of precipitating ion, $C_x$ is the concentration of the precipitating in the solution, and $\gamma_x$ is the ionic activity coefficient of the precipitating ion.

In one or more embodiments, a supersaturation ratio for the sulfate precipitate of a produced water used to treat a seawater may be determined using Equations 3 and 4. In such embodiments, the calculations may be performed using a coded computer program as recognized by industry standards including, but not limited to, the ScaleSoftPitzer program. The ScaleSoftPitzer program, and other programs coded for similar scale prediction, may calculate the supersaturation ratio using either ion pairing dynamics or the Pitzer equation.

The degree of supersaturation, as determined by the interpretation of the calculated supersaturation ratio, is the driving force for the precipitation reaction, such as a sulfate precipitate formation, and implies the possibilities for scale precipitation. As shown below, Table 2 provides common guidelines values for the interpretation of the supersaturation ratios as calculated using Equation 3.

TABLE 2

Guidelines for the Interpretation of Calculated Supersaturation Ratios

| Supersaturation Ratio | Interpretation |
| --- | --- |
| <1 | Under-saturated for this scale type. Non-scaling |
| 1-3 | Slightly supersaturated. Likelihood of scale formation is marginal. |
| 3-10 | Scale likely, but should not be severe. |
| 10-100 | Scale almost certain to occur. Expected to be strongly scaling. |
| >100 | Severe scaling likely. |

In one or more embodiments, the removal of sulfate ions from the seawater prior to use of the seawater in an oilfield operation can help prevent scale formation, thus reducing damage to the subterranean zone and enabling larger amounts of hydrocarbons to be accessed. In such embodiments, the use of produced water to treat seawater such that the sulfate concentration decreases and provides the advantage of recycling produced water. In such cases, the recycling of produced water reduces the cost of disposing of the produced water. Additionally, the use of produced water in one or more embodiments may address the shortage of water supply in on-site oil and gas reservoir.

EXAMPLES

Figure 3:
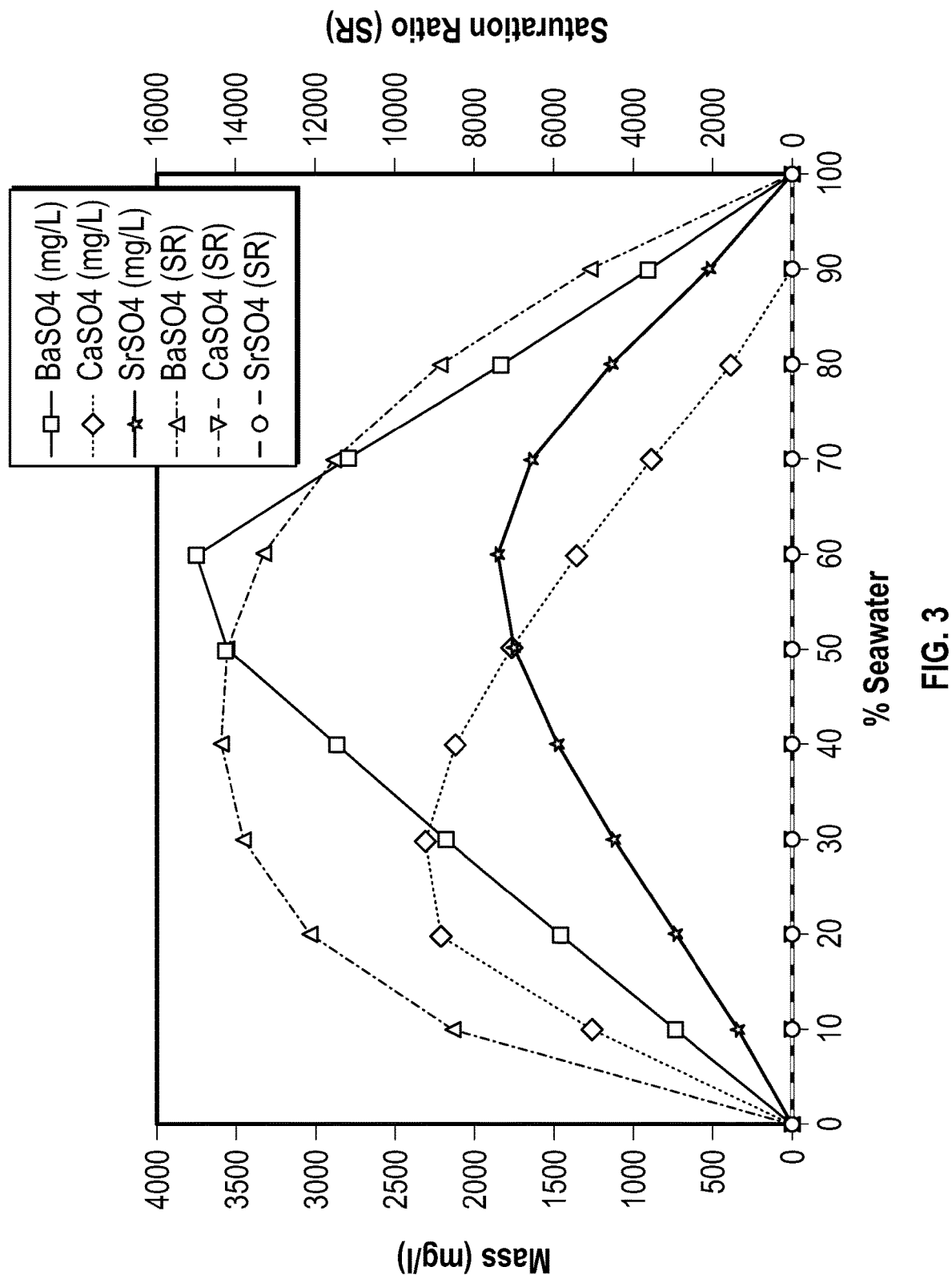
FIG. 3 is a chart displaying results of calculated scale ratios upon mixing various ratios of seawater and produced waters in accordance with one or more embodiments.

Materials and Methods:

Barium sulfate ($BaSO_4$), calcium sulfate ($CaSO_4$), and strontium sulfate ($SrSO_4$) scales were predicted using the sulfate scale prediction calculation described above using the ScaleSoftPitzer program. The environmental parameters of temperature and pressure were assigned at 77° F. and 15 psi, respectively. Seawater and produced water were mixed at different ratios and the supersaturation ratio was calculated for each ratio of seawater to produced water. FIG. 3 displays respective scale ratios upon mixing various ratios of seawater and high salinity produced waters. The composition of each of the seawater and produced water is provided in Table 3, below.

TABLE 3

Water chemistry of seawater and produced waters

| Ion | Seawater (ppm) | Produced Water (ppm) |
| --- | --- | --- |
| $Na^+$ | 16,180 | 7000 |
| $Ca^{2+}$ | 650 | 25,000 |
| $Mg^{2+}$ | 1,730 | 2000 |
| $K^+$ | 700 | 4000 |
| $Sr^{2+}$ | 1 | 2000 |
| $Ba^{2+}$ | <1 | 4000 |
| Cl | 31,000 | 160,000 |
| $SO_4^{2-}$ | 4,020 | 200 |

Methods, Results, and Discussion:

Predictive calculations were performed as described above with the waters of salt contents presented in Table 3. Table 4 provides results of predictive calculations based on volume percent ratio mixtures of the seawater and produced water and predicted amounts of sulfate precipitates formed.

In general, initial comparison of $BaSO_4$ scale predictions results indicate the propensity for barium cations to promote scale formation. In contrast, the likelihood of $CaSO_4$ and $SrSO_4$ scale precipitation is lower due to low supersaturation ratios as discussed below.

For $CaSO_4$, the saturation ratio was determined to be between 0 and 2 with mixing seawater and high salinity produced water at 77° F. and 15 psi, in which the $CaSO_4$ solution is slightly supersaturated. In effect, these results indicate that the likelihood of calcium sulfate scale formation is marginal. In the case of $SrSO_4$, the saturation ratio was determined between 0 and 9 with mixing seawater and high salinity produced water at 77° F. and 15 psi. Similar to the results found for $CaSO_4$ scale formation, $SrSO_4$ scale deposition may occur but is not anticipated to be severe.

Extremely harsh $BaSO_4$ saturation ratios were predicted with mixing seawater and high salinity produced water at 77° F. and 15 psi. The predicted saturation ratio was determined to be between 0 and 14,352. The predicted harsher scaling conditions for $BaSO_4$ was determined to be upon mixing of 10 vol % (volume percent) to 90 vol % seawater and 90 vol % to 10 vol % high salinity produced water with a supersaturation ratio of 5,101-14,352. This was coupled to a huge mass precipitation between 910 mg/l and 3,741 mg/l. Harsh $BaSO_4$ scale deposition is certain to occur when mixes the produced water and seawater at these ratios.

The calculated sulfate remaining in mixed seawater and produced water after $BaSO_4$ precipitation is shown in Table 4, below. The mixing of 10 vol % to 40 vol % seawater and 90 vol % to 60 vol % high salinity produced water can achieve to reduce the sulphate concentration to less 500 ppm in the mixed water in this case.

TABLE 4

Predicted Remaining Sulfate Concentrations After Seawater Treatment

| Seawater: Produced Water ratio | Predicted $BaSO_4$ deposition (ppm) | $[SO_4]^{2-}$ in mixed water without $BaSO_4$ precipitation (ppm) | Removed $[SO_4]^{2-}$ by $BaSO_4$ precipitation (ppm) | Remaining $[SO_4]^{2-}$ in mixed water after fully $BaSO_4$ precipitation (ppm) |
| --- | --- | --- | --- | --- |
| 1:0 | 0 | 4020 | 0 | 4020 |
| 9:1 | 910 | 3618 | 375 | 3243 |
| 8:2 | 1838 | 3216 | 757 | 2459 |
| 7:3 | 2783 | 2814 | 1145 | 1669 |

TABLE 4-continued

Predicted Remaining Sulfate Concentrations After Seawater Treatment

| Seawater: Produced Water ratio | Predicted BaSO$_4$ deposition (ppm) | [SO$_4$]$^{2-}$ in mixed water without BaSO$_4$ precipitation (ppm) | Removed [SO$_4$]$^{2-}$ by BaSO$_4$ precipitation (ppm) | Remaining [SO$_4$]$^{2-}$ in mixed water after fully BaSO$_4$ precipitation (ppm) |
|---|---|---|---|---|
| 6:4 | 3741 | 2412 | 1540 | 872 |
| 5:5 | 3558 | 2010 | 1465 | 545 |
| 4:6 | 2870 | 1608 | 1181 | 427 |
| 3:7 | 2168 | 1206 | 893 | 313 |
| 2:8 | 1456 | 804 | 599 | 205 |
| 1:9 | 732 | 402 | 301 | 101 |
| 0:1 | 0 | 0 | 0 | 0 |

In 1:1 to 1:2 seawater to produced water ratios, a second step of sulfate removal is required, as the predicted remaining sulfate concentration is above 500 ppm. In these cases, an additive, such as a precipitating agent, is necessary to promote precipitation. In such instances, further analyses were performed via thermodynamic calculations to determine a precipitating agent amount to further reduce sulfate concentrations of the water mixtures.

Results of these analyses are shown in Table 5. The precipitating agents used in these predictive analyses were barium chloride (BaCl$_2$) and calcium chloride (CaCl$_2$).

TABLE 5

Predicted Amounts of Additives Necessary to Reduce Sulfate Concentrations

| Seawater: Produced Water Ratio | Additive amount to achieve 1000 ppm [SO$_4$]$^{2-}$ (g/l) | | Additive amount to achieve 500 ppm [SO$_4$]$^{2-}$ (g/l) | |
|---|---|---|---|---|
| | BaCl$_2$ | CaCl$_2$ | BaCl$_2$ | CaCl$_2$ |
| 1:0 | 6.54 | 3.49 | 7.61 | 4.06 |
| 9:1 | 4.85 | 2.59 | 5.93 | 3.17 |
| 8:2 | 3.15 | 1.68 | 4.51 | 2.26 |
| 7:3 | 1.45 | 0.78 | 2.53 | 1.35 |
| 6:4 | — | — | 0.8 | 0.43 |
| 5:5 | — | — | 0.09 | 0.05 |

The term "substantially" as used in this disclosure refers to a majority of, or mostly, as in at least about 50 percent (%), 60%, 70%, 80%, 90%, 95%, 96%, 97%, 98%, 99%, 99.5%, 99.9%, 99.99%, or at least about 99.999% or more.

The term "approximately" as used in this disclosure refers to a deviation or allowance of up to 10%.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method of desulfating seawater, the method comprising:
   adding an amount of a produced water to an amount of a sulfated seawater to form a first precipitating solution;
   agitating the first precipitating solution thereby forming a first precipitate;
   separating the first precipitate from the first precipitating solution to produce a desulfated seawater having a first concentration of sulfate ions;
   measuring the first sulfate ion concentration of the desulfated seawater;
   adding a precipitating agent to the desulfated seawater to form a second precipitating solution comprising a second precipitate; and
   separating the second precipitate from the second precipitating solution to produce a desulfated seawater having a second concentration of sulfate ions.

2. The method of desulfating seawater of claim 1 wherein the second concentration of sulfate ions is less than 500 ppm.

3. The method of desulfating seawater of claim 1, wherein the precipitating agent comprises a solubilized alkaline earth metal halide selected from the group consisting of barium halide, calcium halide, strontium halide, and combinations thereof.

4. The method of desulfating seawater of claim 1, wherein the produced water comprises barium cations in a range from about 1,000 ppm to about 4,000 ppm.

5. The method of desulfating seawater of claim 1, wherein the produced water comprises calcium cations in a range from about 2,000 ppm to about 25,000 ppm.

6. The method of desulfating seawater of claim 1, wherein the method further comprises de-oiling the produced water prior to adding the produced water to the seawater.

7. The method of desulfating seawater of claim 1, wherein the first precipitate and the second precipitate are independently selected from the group consisting of barium sulfate (BaSO$_4$), calcium sulfate (CaSO$_4$), strontium sulfate (SrSO$_4$), and combinations thereof.

8. The method of claim 1, further comprising:
   prior to separating the second precipitate from the second precipitating solution, agitating the second precipitating solution to allow the second precipitate to form.

9. The method of claim 1, further comprising:
   prior to the adding an amount of produced water to an amount of a sulfated seawater, determining a concentration of sulfates of the sulfated seawater, a concentration of a precipitating agent of the produced water, or combinations thereof.

10. A method of desulfating seawater, the method comprising:
    determining a concentration of sulfates in a sulfated seawater;
    determining a concentration of a precipitating agent in a produced water;
    adding an amount of the produced water to an amount of the sulfated seawater to form a first precipitating solution based on the determined concentration of sulfates in the sulfated seawater and the concentration of the precipitating agent in the produced water;
    agitating the first precipitating solution thereby forming a first precipitate;

separating the first precipitate from the first precipitating solution to produce a desulfated seawater having a first concentration of sulfate ions;

measuring the first sulfate ion concentration of the desulfated seawater;

adding a precipitating agent to the desulfated seawater to form a second precipitating solution comprising a second precipitate, wherein the precipitating agent is a solubilized alkaline earth metal halide selected from the group consisting of barium halide, calcium halide, strontium halide, and combinations thereof; and separating the second precipitate from the second precipitating solution to produce a desulfated seawater having a second concentration of sulfate ions.

11. The method of claim 10, further comprising, calculating a supersaturation ratio of the produced water and the sulfated seawater based on the determined concentration of sulfates in the sulfated seawater and the concentration of the precipitating agent in the produced water.

12. The method of desulfating seawater of claim 10, wherein the produced water comprises barium cations in a range from about 1,000 ppm to about 4,000 ppm.

13. The method of desulfating seawater of claim 10, wherein the produced water comprises calcium cations in a range from about 2,000 ppm to about 25,000 ppm.

14. The method of desulfating seawater of claim 10, wherein the method further comprises de-oiling the produced water prior to adding the produced water to the sulfated seawater.

15. The method of desulfating seawater of claim 10, wherein the first precipitate and the second precipitate are independently selected from the group consisting of barium sulfate ($BaSO_4$), calcium sulfate ($CaSO_4$), strontium sulfate ($SrSO_4$), and combinations thereof.

16. The method of claim 10, further comprising:
prior to separating the second precipitate from the second precipitating solution, agitating the second precipitating solution to allow the second precipitate to form.

17. The method of desulfating seawater of claim 10, wherein the produced water comprises barium cations in a range from about 1,000 ppm to about 4,000 ppm.

18. The method of desulfating seawater of claim 10, wherein the produced water comprises calcium cations in a range from about 2,000 ppm to about 25,000 ppm.

19. The method of desulfating seawater of claim 10, wherein the second concentration of sulfate ions is less than 500 ppm.

* * * * *